May 4, 1943.                P. H. WESTERLUND                    2,318,274
                              TRACTOR MOWER
                         Filed Aug. 17, 1942                2 Sheets-Sheet 1
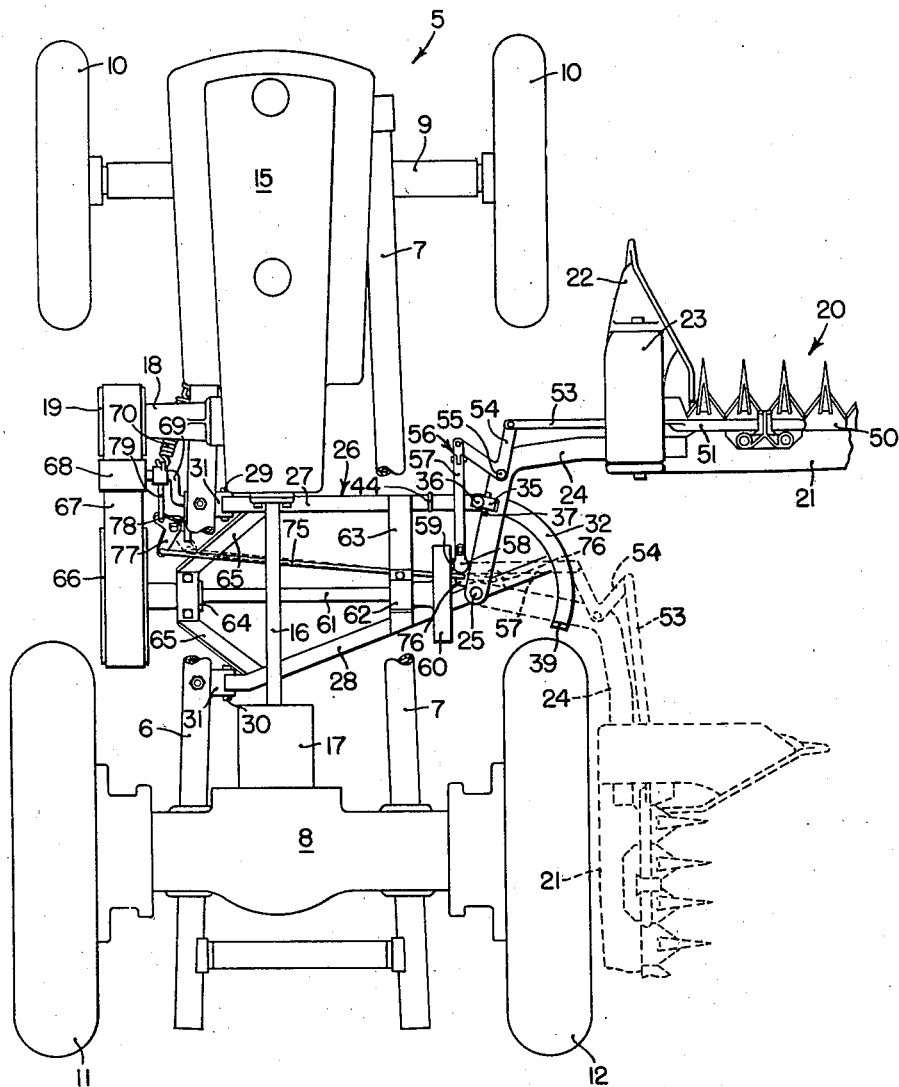
FIG. 1
INVENTOR
PAUL H. WESTERLUND
BY 
ATTORNEYS May 4, 1943.　　　P. H. WESTERLUND　　　2,318,274
TRACTOR MOWER
Filed Aug. 17, 1942　　　2 Sheets-Sheet 2
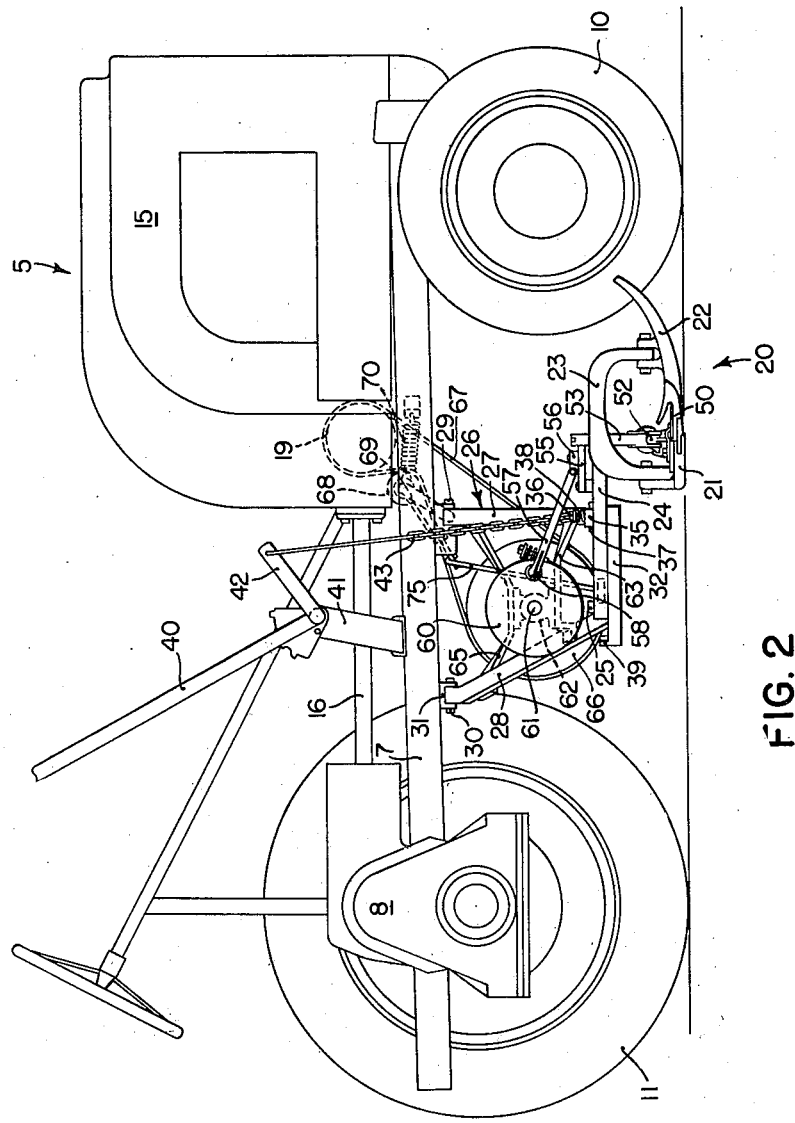
FIG. 2
INVENTOR
PAUL H. WESTERLUND
BY
ATTORNEYS Patented May 4, 1943

2,318,274

UNITED STATES PATENT OFFICE 2,318,274

TRACTOR MOWER

Paul H. Westerlund, Moline, Ill., assignor to Deere & Company, Moline, Ill., a corporation of Illinois Application August 17, 1942, Serial No. 455,143

11 Claims. (Cl. 56—25)

The present invention relates generally to tractor mowers and more particularly to tractor mowers of the type in which the mower cutter bar extends laterally from the side of the tractor frame ahead of one of the wheels of the tractor. It is desirable to mount a mower on a tractor by means which provides for releasing the cutter bar when the latter encounters an obstruction in the field during operation, to permit the bar to swing rearwardly and thus avoid damage to the cutter bar and its supporting and driving connections. Furthermore, it is desirable to arrange the releasable support so that the entire cutter bar moves rearwardly in order to protect the mechanism against an obstruction that encounters the inner end of the shoe as well as one that encounters the outer end of the shoe. It is well-known to those skilled in the art that this can be accomplished by supporting the cutter bar on an arm which is pivotally supported on the tractor at a point spaced inwardly of the inner end of the cutter bar, and it is highly desirable to make this spacing as great as possible in order to provide for an ample rearward movement of the shoe at the inner end of the cutter bar.

When the mower is mounted at the rear of the tractor, there is little difficulty in obtaining this desirable result, for the cutter bar support can be pivoted to the tractor frame at the opposite side of the latter, and the cutter bar can swing rearwardly through a ninety-degree angle to a trailing position behind the tractor. In this case, however, the visibility of the cutter bar from the tractor operator's seat is not as good as it is when the cutter bar is mounted on the tractor near the forward end of the frame, for the operator must turn his head to watch the action of the cutter bar during operation. On the other hand, when the cutter bar is mounted on the tractor ahead of the operator's seat, the supporting arm of the mower must extend across the path of and in front of one of the tractor wheels, thus limiting the extent of rearward swinging movement when the cutter bar encounters an obstruction. In Patent No. 2,292,362, granted to Coultas, August 11, 1942, a complete ninety-degree arc of movement of the cutter bar to a trailing position behind the tractor is accomplished by providing for running the rear wheel of the tractor over the mower shoe during the rearward swinging movement. The principal object of the present invention relates to the provision of a means for pivotally mounting the mower on the tractor frame ahead of one of the rear wheels of the tractor in such a way that the mower can swing rearwardly a complete ninety-degree arc about a point spaced appreciably inward of the inner end of the cutter bar and thereby obtaining an appreciable rearward movement of the mower shoe, without the necessity for lifting the tractor wheel over the latter.

According to the disclosure of the present invention, this is accomplished by providing an angular supporting arm for the cutter bar, which extends forwardly from the pivot connection a distance equal to the distance from the pivot outwardly to the outer side of the tractor wheel. By this means, when the cutter bar is in its rearwardly trailing position, the arm extends laterally in front of the wheel and then rearwardly along the outer side of the latter, permitting the cutter bar to assume a trailing position substantially at right angles to the normal operating position.

A further object of the present invention relates to the provision of driving connections for the cutting apparatus, which are swingable with the cutter bar, and when the latter reaches its trailing position, the driving connections assume a position in which the movement of the cutting apparatus is reduced appreciably from its normal extent of movement, thus minimizing the chances of damage to the cutting apparatus. In the accomplishment of this object, the power is transmitted to drive the reciprocating sickle through a crank and pitman, the latter being arranged so that when the cutter bar swings rearwardly, the pitman is swung to a position substantially parallel with the axis of rotation of the crank.

Still another object of the present invention relates to the provision for lifting the belt tightening idler from the power transmitting belt by movement of the cutter bar rearwardly from its normal operating position.

These and other objects and advantages of my invention will be apparent to those skilled in the art after a consideration of the following description in which reference is had to the drawings appended hereto, in which Figure 1 is a plan view of a tractor mower, showing a portion of the tractor frame broken away to more clearly disclose the details of the mower supporting structure; and Figure 2 is a side elevational view of the tractor mower.

Referring now to the drawings, reference numeral 5 indicates in its entirety a tractor of more or less conventional form, comprising a frame including a pair of longitudinally extending laterally spaced beams 6, 7, rigidly connected at their rear ends to a transverse rear axle housing 8, and mounted at their forward ends on a transverse front axle 9. The front axle 9 is carried on a pair of laterally spaced dirigible supporting wheels 10, journaled at opposite ends of the axle 9, respectively. The rear axle housing 8 is supported at opposite ends, respectively, on a pair of rear traction wheels 11, 12. In Figure 2, the near traction wheel 12 is removed in order to more clearly show the structure. A suitable power plant is mounted within an engine compartment 15 at the forward end of the frame members 6, 7. The engine drives the rear wheels 11, 12 through a rearwardly extending transmission shaft 16 which extends into a gear case 17 mounted on the rear axle housing 8, and is connected through suitable gear mechanism (not shown) to drive the traction wheels 11, 12, in a manner well-known to those skilled in the art. A power take-off 18 is mounted at one side of the tractor and is driven from the tractor power plant, the outer end of the power take-off having a belt pulley 19 mounted thereon.

The mower is indicated in its entirety by reference numeral 20 and includes a cutter bar 21 disposed transversely of the direction of travel intermediate the front and rear wheels of the tractor, and outside of the plane of rotation of the rear tractor wheel 12. The inner end of the cutter bar is attached to a mower shoe 22 of conventional form, which is pivotally mounted on a conventional shoe arch 23.

The shoe arch 23 is mounted on the outer end of a mower supporting arm 24 which is angular in shape, extending inwardly from the arch 23 and rearwardly to a pivot connection 25, which is disposed appreciably behind the cutter bar and inwardly of the inner end thereof. The vertical pivot 25 provides for generally horizontal swinging movement of the angular arm 24, with respect to a mower supporting frame 26 comprising a pair of longitudinally spaced laterally extending members 27, 28, which are hinged at their inner ends by means of fore and aft aligned horizontal pivots 29, 30 to a pair of brackets 31, which are securely bolted to the tractor frame member 6 on the opposite side of the tractor from the mower cutter bar 21. The two frame members 27, 28 extend beneath the other tractor frame member 7 and diverge outwardly, the outer end of the forward member 27 being curved rearwardly, as at 32, and rigidly connected, as by welding, to the outer end of the rear member 28. The angular mower arm 24 is attached by the vertical pivot 25 to the rear arm 28 and extends forwardly therefrom, bearing upon the curved portion 32 of the frame 26. A latch 35 is mounted on the forward member 27 of the frame 26 on a bolt 36 and engages a lug 37 fixed to the forwardly extending portion of the arm 24, and is urged into engagement therewith by a coil spring 38 encircling the bolt 36. The pressure of the spring 38 is sufficient to hold the cutter bar supporting arm in forwardly extending position during normal operation, to maintain the cutter bar 21 in a normal laterally extending operating position, but when the cutter bar encounters an obstruction in the field during normal operation, the forward momentum of the tractor overcomes the pressure of the spring 38 and releases the arm 24 for rearward swinging movement about the pivot 25. An upwardly turned stop 39 limits the rearward swinging movement of the arm 24 to a position as indicated in dotted lines in Figure 1, in which the cutter bar 21 trails rearwardly along the outer side of the traction wheel 12. In this position, it will be noted that the normally forwardly extending portion of the angular mower arm 24 extends directly in front of the tractor wheel 12 in the path of movement thereof, but is prevented from interfering with the latter by the stop 39. The length of the forwardly extending portion of the arm 24 is sufficient so the distance from the cutter bar rearwardly to the pivot 25 in normal position is at least equal to the distance from the pivot 25 laterally to the outer plane of the traction wheel 12. A comparison of the normal position of the cutter bar shown in solid lines and the trailing position shown in dotted lines will bring out that the inner end of the cutter bar and the mower shoe has quite an appreciable rearward movement, so that even though the shoe or the inner end of the cutter bar encounters an obstruction, there is sufficient movement to provide time enough for the operator to stop the tractor before damage is done.

The mower can be swung vertically in a transverse plane by swinging the supporting frame 26 vertically about the pivots 29, 30. This is accomplished by means of a lever 40 swingably mounted on a bracket 41 on the tractor frame member 7 and having an arm 42 connected through a chain member 43 to an eyebolt 44, fixed to the forward member 27 of the frame 26.

Cutting apparatus in the form of a reciprocating sickle 50 is disposed on the cutter bar 21 in cooperative relative thereto. The sickle is driven through a knife head 51, connected through a ball and socket joint 52 to a connecting rod 53, which is pivoted to one arm of a bell crank 54. The bell crank is pivoted to the angular supporting arm 24 on a vertical pivot 55. The other arm of the bell crank 54 is connected through a universal joint 56 to a pitman 57. The opposite end of the pitman 57 is connected through a ball and socket joint 58 to a crank 59 on a flywheel 60. The flywheel 60 is fixed to the outer end of a shaft 61, which is journaled adjacent the flywheel 60 in a bearing 62, the latter being fixedly mounted on a bracing member 63 connected between the two transverse members 27, 28 of the frame 26. The opposite end of the shaft 61 is journaled in a bearing 64, which is supported on a pair of frame members 65, which converge downwardly between the two transverse frame members 27, 28. A belt pulley 66 is fixed to the end of the shaft 61, in fore and aft alignment with the power take-off belt pulley 19, and is operatively connected therewith by a flexible belt 67. The belt 67 is normally loose around the two pulleys 19, 66, but is maintained tightly in driving relation by means of an idler 68, journaled on a crank 69, which is swingably mounted in the forward bracket 31, from which the crank arm 69 extends upwardly and inclines forwardly. A tension spring 70 is connected to the crank arm 69 and extends forwardly therefrom and is anchored to the tractor frame member 6, so that it applies a pressure against the idler 68 forcing it downwardly and forwardly upon the belt 67 to tighten the latter.

Thus, it is evident that during operation of the tractor engine, power is transmitted through the belt 67 between the power shaft pulley 19 and the drive shaft pulley 66, as long as the idler 68 is held against the belt. Rotation of the drive shaft 61 drives through the crank 59 and pitman 57 to reciprocate the bell crank 54 about the vertical pivot 55 on the arm 24. The bell crank 54 transmits reciprocatory movement through the connecting rod 53 to the sickle 50. Inasmuch as the drive shaft 61 is journaled on the frame 26, which is hinged to the tractor for vertical swinging movement, the shaft 61 obviously swings vertically with the frame about the axis of the hinge pivots 29, 30. This rocks the pulley 66, relative to the power shaft pulley 19, but the flexible belt 67 accommodates this movement by a slight twisting action, which is not excessive, due to the fact that the pulley 66 is disposed near the axis of the hinge pivot 29, 30.

When the cutter bar encounters an obstruction, the latch 35 is overcome, allowing the arm 24 to swing rearwardly about the pivot 25. When this happens, the bell crank 54 and connecting rod 53 swing rearwardly with the arm 24, thereby swinging the pitman 57 outwardly about the ball and socket joint 58 into the position indicated in dotted lines in which the pitman 57 is substantially parallel to the drive shaft 61 but inclined slightly downwardly. In this position of the pitman, however, the rotation of the crank 59 transmits very little reciprocative movement to the bell crank 54, even though the shaft 61 continues to rotate at normal speed. This is a desirable condition, especially in case the cutter bar has engaged a rock or small tree, which might break the sickle blades. It will be evident to those skilled in the art, that in a rearwardly trailing position of the cutter bar, the closer the universal joint 56 approaches the axis of the drive shaft 61, the smaller will be the movement of the sickle. Returning the cutter bar to its normal operating position will automatically restore the normal reciprocating movement to the cutting apparatus.

The transmission of power to the sickle can be interrupted by swinging the idler arm 69 rearwardly to decrease the tension on the belt 67. This can be accomplished manually if desired, or it can be accomplished automatically, responsive to rearward movement of the cutter bar out of normal operating position by means of a tension member 75 hooked through a lug 76 on the side of the arm 24 ahead of the pivot 25. The opposite end of the tension member 75 is connected to a bell crank 77, which is pivoted to a bracket 78, fixed to the tractor frame member 6. The other end of the bell crank 77 is connected through a link 79 to the idler crank 69. Thus, when the mower arm 24 swings rearwardly about the pivot 25, the tension member 75 is pulled laterally to the position shown in dotted lines, thereby acting through the bell crank 77 to swing the idler arm 69 rearwardly to disengage the idler 68 from the belt 67. This automatic control of the idler has the effect of positively interrupting transmission of power to the sickle, although in many cases it is not necessary, since the arrangement of the pitman and crank 59 also has the effect of reducing the amount of movement of the sickle when the cutter bar is in rearward trailing position, and therefore the automatic idler control is optional.

I claim:

1. In combination with a vehicle having a supporting wheel, a mower disposed across the path of and ahead of said supporting wheel and including a laterally extending cutter bar, means for supporting said mower from said vehicle including a vertical pivot disposed inwardly of said supporting wheel and spaced to the rear of said cutter bar a distance substantially equal to the distance from said pivot laterally to the outer side of said wheel, whereby the cutter bar may be swung rearwardly from a laterally extending operating position to an inoperative trailing position approximately parallel to said supporting wheel.

2. In combination with a vehicle having a supporting wheel, a primary frame pivoted to the vehicle for vertical swinging movement, a mower disposed across the path of and ahead of said supporting wheel and including a laterally extending cutter bar, a vertical pivot connecting said mower to said primary frame at a point spaced inwardly of said supporting wheel and spaced to the rear of said cutter bar a distance substantially equal to the distance from said pivot laterally to the outer side of said wheel, whereby the cutter bar may be swung from a laterally extending operating position to an inoperative position alongside said supporting wheel.

3. A mower comprising a vehicle having a supporting wheel, a mower frame comprising a forwardly extending part and a second part extending laterally from the forward end of the first part, the second part extending across the path of and ahead of said supporting wheel, a cutting mechanism extending laterally from the outer end of said second part, means for supporting said mower frame from said vehicle including a vertical pivot at the rear end of the first part thereof about which pivot said cutting mechanism may be swung from a laterally extending operating position to an inoperative position alongside said supporting wheel with the first part of said mower frame extending across the path of said supporting wheel.

4. A mower comprising a tractor having front dirigible wheels and a pair of laterally spaced rear traction wheels, a cutter bar structure associated with said tractor and comprising a cutter bar normally disposed between said front and rear wheels and including cutting mechanism lying entirely outside the plane of one of said wheels, an angular supporting member connected with said shoe and normally extending inwardly of said wheel and rearwardly, means for pivotally supporting said angular support on said tractor for horizontal swinging movement, said pivot means being spaced rearwardly of said cutting mechanism a distance at least equal to the distance from said pivot to the outside surface of said wheel, whereby said cutter bar structure can swing rearwardly to a trailing position along the outer side of said wheel, and means for releasably retaining said cutter bar in its normal operating position.

5. A mower comprising a tractor having front dirigible wheels and a pair of laterally spaced rear traction wheels, a cutter bar structure associated with said tractor and comprising a cutter bar normally disposed between said front and rear wheels and including cutting mechanism lying entirely outside the plane of one of said wheels, an angular supporting member connected with said shoe and normally extending inwardly of said wheel and rearwardly, a supporting arm swingably connected to the tractor by means providing for angular vertical movement relative thereto, means for pivotally supporting said angular support on said arm for horizontal movement relative thereto, said pivot means being spaced rearwardly of said cutting mechanism a distance at least equal to the distance from said pivot to the outside surface of said wheel, whereby said cutter bar structure can swing rearwardly to a trailing position along the outer side of said wheel, and means for releasably retaining said cutter bar in its normal operating position.

6. A mower comprising a tractor having front dirigible wheels and a pair of laterally spaced rear traction wheels, a cutter bar structure associated with said tractor and comprising a cutter bar normally disposed between said front and rear wheels and including cutting mechanism lying entirely outside the plane of one of said wheels, an angular supporting member connected with said shoe and normally extending inwardly of said wheel and rearwardly, a supporting frame swingably connected to the tractor by means providing for angular vertical movement relative thereto, means for pivotally supporting said angular support on said frame for horizontal movement relative thereto, a portion of said frame underlying said angular support outwardly of said pivot and serving to slidably support the angular support as the latter swings about said pivot, said pivot means being spaced rearwardly of said cutting mechanism a distance at least equal to the distance from said pivot to the outside surface of said wheel, whereby said cutter bar structure can swing rearwardly to a trailing position along the outer side of said wheel, and means for releasably retaining said cutter bar in its normal operating position, said last named means comprising latch means between said underlying frame portion and said angular support, spaced forwardly of said pivot means.

7. A mower comprising a primary frame, a secondary frame pivotally connected to said primary frame for relative swinging movement, reciprocative cutting mechanism carried by said secondary frame, a drive shaft on said primary frame disposed at right angles to the axis of pivotal movement of said secondary frame and having a crank in close proximity to said axis, and a pitman connected to said cutting apparatus and having a flexible connection with said crank and disposed normally substantially perpendicular to said drive shaft but swingable with said secondary frame to a position parallel to said shaft, thereby appreciably reducing the movement of said cutting apparatus.

8. A mower comprising a wheel supported frame, a cutter bar associated therewith, a cutter bar supporting arm pivotally mounted on said frame for horizontal swinging movement relative thereto, to swing said cutter bar from a laterally extending position at one side of said frame to a rearwardly trailing position, said arm extending normally forwardly from the pivot connection, a transversely disposed drive shaft mounted on said frame, a crank on said shaft in close proximity to said pivot, a pitman flexibly connected to said crank and extending forwardly therefrom, and means at the forward end of said pitman for driving reciprocative cutting apparatus on said cutter bar, said pitman being carried on said supporting arm and swingable with the latter approximately ninety degrees into a generally transverse position extending outwardly from said crank, whereby the rotation of said crank transmits appreciably less reciprocating movement to said cutting apparatus when said cutter bar is in said rearwardly trailing position.

9. A mower comprising a wheel supported frame, a cutter bar associated therewith, a cutter bar supporting arm pivotally mounted on said frame for horizontal swinging movement relative thereto, to swing said cutter bar from a laterally extending position at one side of said frame to a rearwardly trailing position, said arm extending normally forwardly from the pivot connection, a transversely disposed drive shaft mounted on said frame, a crank on said shaft in close proximity to said pivot, a pitman flexibly connected to said crank and extending forwardly therefrom, a bell crank mounted on said arm forward of said crank and connected to said pitman, a reciprocating sickle mounted on said cutter bar and connected to said bell crank to be driven thereby from said pitman and crank, said pitman, bell crank, and sickle being swingable rearwardly with said arm and cutter bar into a position in which the pitman extends laterally outwardly from said crank, in which position the rotating crank transmits very little movement through said pitman to said sickle.

10. A mower comprising a wheel supported frame, a mower arm swingably supported on said frame by means providing for horizontal swinging movement relative thereto, cutting mechanism carried on said arm, a drive shaft operatively connected with said cutting mechanism for driving the latter, a power shaft journaled on said frame, a flexible power transmitting belt connecting said shafts, an idler pulley journaled on a crank, the latter being swingably carried on said frame adjacent said belt, means for normally biasing said idler pulley against said belt to tighten the latter, and means connecting said mower arm and said crank and arranged to swing the latter and said idler pulley away from said belt against the action of said biasing means when said mower arm is swung relative to said frame, thereby interrupting the drive to said drive shaft.

11. A mower comprising a mobile frame, a mower supporting frame hinged to said mobile frame providing for vertical swinging movement relative thereto, a cutter bar supporting arm pivotally mounted on said supporting frame for horizontal swinging movement from a normal operating position in which the cutter bar extends laterally from one side of said mobile frame to a trailing position, cutting mechanism supported on said arm, a drive shaft journaled on said mower supporting frame and operatively connected to drive said cutting apparatus, a pulley on said drive shaft disposed near the supporting hinge of the frame, a power shaft journaled on said mobile frame, a pulley on said power shaft, a belt trained over said pulleys, an idler contacting said belt, a crank, on which said idler is journaled, swingably mounted on one of said frames and biased to urge said idler against said belt to tighten the latter, a tension member connecting said arm to said crank for pulling said idler away from said belt when the arm swings out of said normal operating position, and releasable latch means for normally holding said arm in said operating position.

PAUL H. WESTERLUND.